Nov. 26, 1929.  J. H. HUNT  1,737,048
STEERING MECHANISM
Filed March 13, 1925

Inventor
John H. Hunt
By Spencer, Duvall & Hardman
Attorney

Patented Nov. 26, 1929

1,737,048

UNITED STATES PATENT OFFICE

JOHN H. HUNT, OF DAYTON, OHIO, ASSIGNOR TO GENERAL MOTORS RESEARCH CORPORATION, OF DAYTON, OHIO, A CORPORATION OF DELAWARE

STEERING MECHANISM

Application filed March 13, 1925. Serial No. 15,378.

This invention relates to mechanism for steering an automotive vehicle, and one of the objects of the invention is to dampen the oscillation of the front wheels about the pivot pins of their axles, said oscillation being commonly known as "front wheel shimmy".

This object of the invention is carried out by opposing the oscillations of the front wheels by the vibratory movement of a mass having a natural period of vibration close to the period of front wheel oscillation, but out of phase therewith.

Further objects and advantages of the present invention will be apparent from the following description, reference being had to the accompanying drawings in which preferred forms of the present invention are clearly shown.

Figure 1:
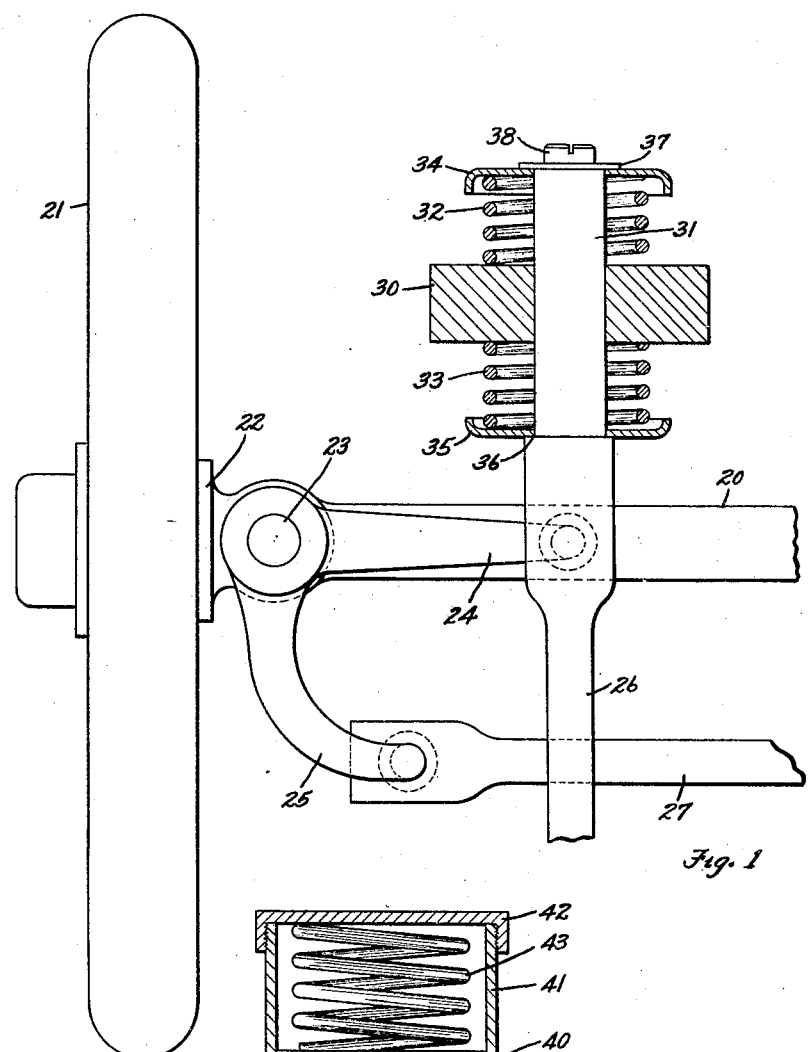
Fig. 1 is a fragmentary view of steering mechanism including the present invention, which is shown in section.

Referring to the drawings, 20 designates the front fixed axle of an automobile, which is supported at each end by the front wheels, the left wheel 21 being shown in the drawing. Wheel 21 rotates upon a steering axle 22, which is pivotally supported by a pin 23 carried by the end of the fixed axle 20. The axle 22 is connected with steering arms 24 and 25, which are connected respectively with a drag link 26 and a steering cross-rod 27. It will be understood by those skilled in the art, that the drag link 26 is connected with the usual wheel-operated steering mechanism, and that the cross-rod 27 is connected at its right end (not shown) with a steering arm connected with the steering axle of the right front wheel.

In order to counteract oscillations of the front wheels and steering mechanism connected therewith, a reaction weight or disc 30 is slidably mounted upon a rod 31, extending from the drag link 26. The weight 30 is confined between springs 32 and 33, bearing respectively against washers 34 and 35. Washer 35 abuts a shoulder 36 provided by the drag link 26, and washer 34 is retained by a washer 37 held by a screw 38, threadedly engaging the end of rod 31. The mass of the disc 30 and the characteristics of the springs 32 and 33 are such as to cause the weight to vibrate and counteract the vibrations of the front wheels about their steering pins 23. The period of weight 30 is close to the period of front wheel oscillation and is out of phase therewith. Therefore, the tendency of the steering arm 24 to continue in a vibratory movement in a counter-clockwise direction is opposed by a movement of the weight 30 toward the front axle 20 and, vice versa. In other words, the tendency of the front wheels to persist in vibratory oscillations known as "shimmying", is resisted by countervibrations produced by the reaction weight 30.

Figure 2:
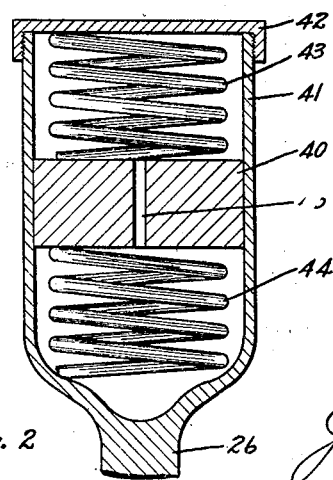
Fig. 2 is a fragmentary view in section, of a modified form of the invention.

Fig. 2 shows a modified form of the invention, in which the reaction weight 40 is in the form of a piston sliding within a cylinder 41 formed as an extension of the drag link 26. The cylinder 41 is closed by a cap 42 which provides a vessel for liquid of the desired viscosity, such as lubricating oil. Springs 43 and 44 are interposed respectively between the weight 40 and the cap 42 in the end of the cylinder 41 opposite the cap. The weight 40 is provided with a suitable orifice 45 so that the liquid in the cylinder 41 will retard the vibrations of the weight 40 in order that the periodicity of the weight 40 will be such as required to counteract shimmying.

It is obvious that the reaction weight can be mounted upon other members of the steering mechanism than the drag link. For example, the reaction weight could be mounted to slide along the steering cross-rod 27, or could be mounted upon a rod carried by the steering arm 24.

While the forms of embodiment of the invention as herein disclosed, constitute preferred forms, it is to be understood that other forms might be adopted, all coming within the scope of the claims which follow.

What is claimed is as follows:

1. In a vehicle, the combination with a steering road wheel having a pivotally mounted steering axle, of means of turning the axle to steer the vehicle, and means including a resiliently-supported weight connected with the means for turning the axle, said weight having a natural frequency of vibration such as to oppose the periodic oscillations of the wheel about its axle pivot.

2. In a vehicle, the combination with a steering road wheel having a pivotally mounted steering axle, of means of turning the axle to steer the vehicle, and means including two springs and a weight adapted to vibrate between the springs for counteracting the oscillatory vibrations of the wheel about its axle pivot.

3. In a vehicle, the combination with a steering road wheel having a pivotally mounted steering axle, of means including an arm connected with the steering axle, and a rod for moving the arm for steering the wheel, and a reaction weight resiliently supported by the rod for counteracting the oscillatory vibrations of the wheel about its axle pivot.

4. In a vehicle, the combination with a steering road wheel having a pivotally mounted steering axle, of means including an arm connected with the wheel axle, a rod for moving the arm for steering the wheel, and a reaction weight slidably supported by the rod and confined between two springs carried by the rod for counteracting periodic oscillations of the steering wheel about its axle pivot.

5. An inertia member, comprising a cylinder, a free piston slidable therein, the said cylinder and piston provided with a dashpot opening from one side of the piston to the other and the cylinder arranged to contain a fluid.

6. An inertia member, having in combination, a cylinder arranged to contain a fluid, and a free piston slidable in said cylinder, and means for normally centralizing said piston, the said piston and cylinder arranged to have an opening from one side of the piston to the other.

7. In steering gear or control mechanism, a movable steering member, and a free inertia member supported on the movable steering member but having a connection between the two that permits relative movement and dissipation of energy under sudden forces.

8. In steering gear or control mechanism, a movable control member, and free inertia member supported thereon, the said two members having a dashpot cylinder and hydraulic fluid connection which permits relative movement under sudden impulses but dissipates energy calculated to dampen such impulses.

9. In steering gear or control mechanism, a movable control member, a free inertia member comprising a dashpot piston, a fluid-containing cylinder in which said piston moves, and means tending to centralize the piston.

10. In steering gear or control mechanism, a movable control member, an inertia member in the form of a piston, a dashpot cylinder supporting the piston on the control member, the said piston being provided with an orifice from one side to the other, and springs tending to centralize the piston.

11. Means for minimizing vibrations accompanying vibratory movements of steering road wheels of motor driven vehicles about their pivot pins comprising a member so connected with the road wheels that both the member and the road wheels move together; and a reaction mass elastically connected to said member; said reaction mass having a natural frequency of vibration such that it tends to counteract vibrations of the steering road wheels.

12. In a vehicle having a road wheel which is movable to steer the vehicle, a movable member for moving said wheel; a relatively heavy inertia member associated with and capable of movement in unison with said movable member, but which inertia member is non-rigidly connected with said movable member; and yieldable spring mechanism associated with said two members and tending to cause said inertia member to move with said movable member.

13. In a vehicle having a road wheel which is movable about a substantially vertical axis to steer the vehicle, a manually operable member for moving said wheel; a relatively heavy inertia member associated with and capable of moving with said manually operable member, said inertia member partaking of slow movements of said manually operable member but acting to damp rapid vibratory movement thereof; and yieldable means associated with said members whereby they may move independently of one another.

14. Means for preventing oscillation of a steering wheel of a motor road vehicle comprising a spring controlled weight adapted to oscillate under such control at a different periodicity from that of the wheel, the spring controlling the weight affording an elastic coupling of the weight to the wheel whereby any tendency of the wheel to oscillate is damped out by the consequent tendency of the spring controlled weight to oscillate with a different periodicity.

15. In a vehicle, the combination with a steering road wheel having a pivotally mounted steering axle, of means of turning the axle to steer the vehicle, and means including a resiliently supported weight connected with the means for turning the axle, said weight having a natural frequency of vibration such as to oppose the periodic oscillations of the wheel about its axis pivot.

In testimony whereof I hereto affix my signature.

JOHN H. HUNT.